United States Patent
Shimizu

(10) Patent No.: US 7,839,130 B2
(45) Date of Patent: Nov. 23, 2010

(54) SWITCHING REGULATOR CAPABLE OF PREVENTING REVERSE CURRENT

(75) Inventor: Shinya Shimizu, Kawanishi (JP)

(73) Assignee: Ricoh Company, Ltd., Tokyo (JP)

( * ) Notice: Subject to any disclaimer, the term of this patent is extended or adjusted under 35 U.S.C. 154(b) by 395 days.

(21) Appl. No.: 12/115,940

(22) Filed: May 6, 2008

(65) Prior Publication Data

US 2008/0278129 A1 Nov. 13, 2008

(30) Foreign Application Priority Data

May 11, 2007 (JP) .............................. 2007-126610

(51) Int. Cl.
*G05F 1/40* (2006.01)
(52) U.S. Cl. ...................................... 323/282; 323/901
(58) Field of Classification Search ................. 323/282, 323/283, 284, 285, 351, 901; 363/49
See application file for complete search history.

(56) References Cited

U.S. PATENT DOCUMENTS

| | | | | |
|---|---|---|---|---|
| 5,552,695 | A * | 9/1996 | Schwartz | 323/271 |
| 6,965,223 | B1 * | 11/2005 | MacLean et al. | 323/284 |
| 6,969,977 | B1 * | 11/2005 | Smith | 323/222 |
| 7,166,992 | B2 * | 1/2007 | Kudo et al. | 323/282 |
| 7,166,993 | B2 | 1/2007 | Shimizu et al. | |
| 7,352,160 | B2 | 4/2008 | Shimizu et al. | |
| 7,492,132 | B2 * | 2/2009 | Kuroiwa et al. | 323/222 |
| 7,616,464 | B2 * | 11/2009 | Phadke et al. | 363/79 |
| 2004/0169498 | A1 * | 9/2004 | Goder et al. | 323/222 |
| 2007/0035281 | A1 * | 2/2007 | Kuroiwa et al. | 323/222 |
| 2007/0253229 | A1 * | 11/2007 | Dowlatabadi | 363/49 |
| 2008/0068869 | A1 | 3/2008 | Shimizu | |
| 2008/0079405 | A1 | 4/2008 | Shimizu | |

FOREIGN PATENT DOCUMENTS

| | | |
|---|---|---|
| JP | 62-144569 | 6/1987 |
| JP | 2000-092824 | 3/2000 |
| JP | 2000-102244 | 4/2000 |
| JP | 2006-262646 A | 9/2006 |
| JP | 4070654 | 1/2008 |
| KR | 10-2004-008603 A | 10/2004 |

OTHER PUBLICATIONS

Korean Office Communication for JP 2007-126610.

* cited by examiner

*Primary Examiner*—Adolf Berhane
(74) *Attorney, Agent, or Firm*—Dickstein Shapiro LLP

(57) ABSTRACT

A switching regulator includes a first switch, an inductor, a second switch, a control circuit to control a switching operation by switching the first switch and switching the second switch complementally to the first switch, a reverse current protection circuit to shut off a current through the second switch to prevent a reverse current from an output terminal toward the second switch, and a soft-start circuit to cause the control circuit to perform a soft-start operation in which the output voltage is being increased gradually during a time period from a start-up to a predetermined elapsed time. The soft-start circuit causes the reverse current protection circuit to stop a shutoff operation of the current through the second switch when a generation or an indication of the reverse current is detected during the soft-start operation instructed by the control circuit.

4 Claims, 3 Drawing Sheets

SWITCHING REGULATOR CAPABLE OF PREVENTING REVERSE CURRENT

This patent application claims priority from Japanese Patent Application No. 2007-126610 filed on May 11, 2007 in the Japan Patent Office, the entire contents of which are hereby incorporated by reference herein.

BACKGROUND OF THE INVENTION

1. Field

This patent specification describes a switching regulator, and more particularly, a switching regulator capable of preventing reverse current.

2. Background Art

Recently, energy saving has been actively promoted to protect the environment. For battery-powered portable equipment, such as mobile phones, digital cameras, and the like, energy efficiency is especially important to prolong battery life. Such portable equipment typically uses a switching regulator that includes an inductor because it is efficient and can be made compact.

Such switching regulator generally includes a switching transistor and a synchronous rectification transistor, and operates in a continuity mode and a discontinuity mode. In the continuity mode, a current flows through the inductor continuously. By contrast, in the discontinuity mode, the current does not flow through the inductor continuously. Consequently, when the switching regulator operates in the discontinuity mode under light load conditions, a reverse current may flow from an output terminal to the inductor. As a result, the performance efficiency of the switching regulator decreases. Further, in such switching regulator, a rush current and an overshoot in an output voltage of the switching regulator may be generated due to an overdrive at start-up.

To avoid generation of the rush current and the overshoot of the output voltage at start-up, a known switching regulator employs a soft-start circuit that can increase the output voltage gradually. More specifically, the soft-start circuit increases an on-duty cycle of a PWM (Pulse Width Modulation) pulse gradually for a predetermined period from start-up so as to prevent generation of the rush current and the overshoot of the output voltage.

To avoid the reverse current, the switching regulator generally employs a reverse current prevent circuit like that shown in FIG. 1.

In FIG. 1, the switching regulator includes a switching transistor M101, a synchronous rectification transistor M102, an inductor L101, output capacitors C101 and C102, a comparator 101, and an AND circuit 102. The switching transistor M101 and the synchronous rectification transistor M102 are NMOS transistors.

When energy stored in the inductor L101 is discharged completely while the synchronous rectification transistor M102 is on, the reverse current occurs. Namely, a charge stored in the output capacitor C102 connected between the output terminal and ground discharges to ground through the inductor L101 and the synchronous rectification transistor M102. When the reverse current occurs, a voltage VA at a connection node A between the inductor L101 and the synchronous rectification transistor M102 becomes a positive value.

The voltage VA at the connection node A is input to an inverted terminal of the comparator 101. A ground voltage Vss is input to a non-inverted terminal of the comparator 101. When the voltage VA becomes the positive value, the comparator 101 outputs a signal with a low level.

An output terminal of the comparator 101 is connected to one input terminal of the AND circuit 102. A PWM signal is input to another input terminal of the AND circuit 102. When an output voltage of the comparator 101 is a high level, the synchronous rectification transistor M102 switches on/off in accordance with a signal level of the PWM signal. When the output voltage of the comparator 101 is a low level, the AND circuit 102 outputs a low level independently of the signal level of the PWM signal. When the output voltage of the AND circuit 102 is a low level, the synchronous rectification transistor M102 is shut off so as to prevent the reverse current.

However, a minimum duty cycle of the PWM signal which drives the switching transistor M101 cannot be made too small due to circuit delays. When a switching regulator using the soft-start circuit operates under light load conditions at start-up, an overshoot may occur because the output voltage rises too fast to avoid an occurrence of the overshoot using a pulse width of the minimum duty cycle of the PWM signal which prevents the overshoot in a normal load condition. There is no other path but a path through the load to discharge the charge stored in the output capacitor C102, especially on a switching regulator using a rectification diode in stead of the synchronous rectification transistor M102, and the switching regulator shown in FIG. 1 which includes the reverse current protection circuit.

When an on-time of the switching transistor M101 cannot be made short under conditions such as those of a small load current, a large amount of charge may be stored in the output capacitor C102. As a result, an overshoot occurs and the output voltage swings over a maximum voltage. Further, because of the small load current, it takes relatively long to discharge the charge stored in the output capacitor C102. Therefore, the switching transistor M101 may be turned on again by the on-pulse signal of the PWM signal before the output voltage recovers from overshooting.

SUMMARY

This patent specification describes a novel switching regulator that includes a first switch, an inductor, a second switch, a control circuit to control a switching operation by switching the first switch and switching the second switch complementally to the first switch, a reverse current protection circuit to shut off a current through the second switch to prevent a reverse current from an output terminal toward the second switch, and a soft-start circuit to cause the control circuit to perform a soft-start operation in which the output voltage is being increased gradually during a time period from a start-up to a predetermined elapsed time. The soft-start circuit causes the reverse current protection circuit to stop a shutoff operation of the current through the second switch when a generation or an indication of the reverse current is detected during the soft-start operation instructed by the control circuit.

This patent specification further describes a novel switching regulator that includes first, second, and third switches connected in series, and a reverse current detection circuit to shut off the third switch to stop a current flowing through the second switch when the reverse current protection circuit detects a generation or an indication of the reverse current based on a voltage at a connection node between the first switch and an inductor.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
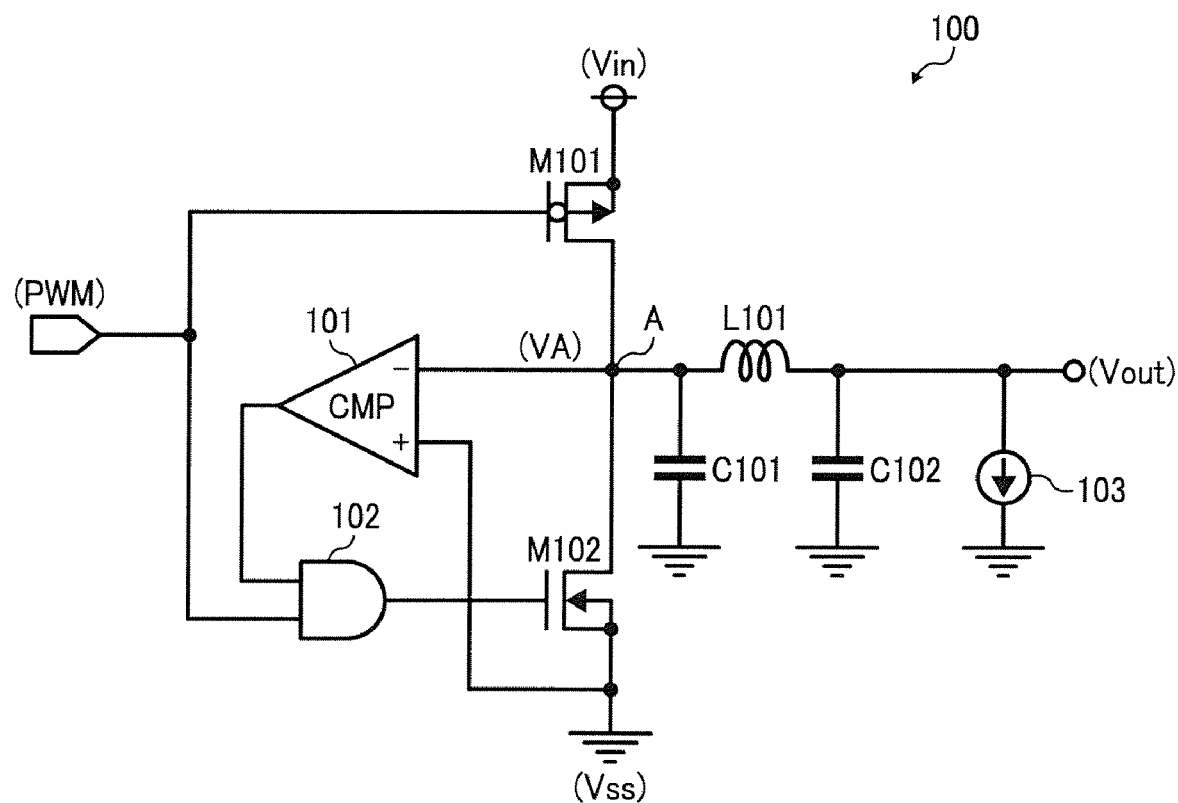
FIG. 1 illustrates a conventional switching regulator employing a reverse current prevent circuit.

In describing certain preferred embodiments illustrated in the drawings, it is to be noted that specific terminology is employed solely for the sake of clarity. Accordingly, the disclosure of the present patent specification is not intended to be limited to the specific terminology so selected, and it is therefore to be understood that each specific element includes all technical equivalents that operate in a similar manner and achieve a similar result.

Referring now to the drawings, wherein like reference numerals designate identical or corresponding parts throughout the several views, switching regulators according to certain example embodiments are described.

Figure 2:
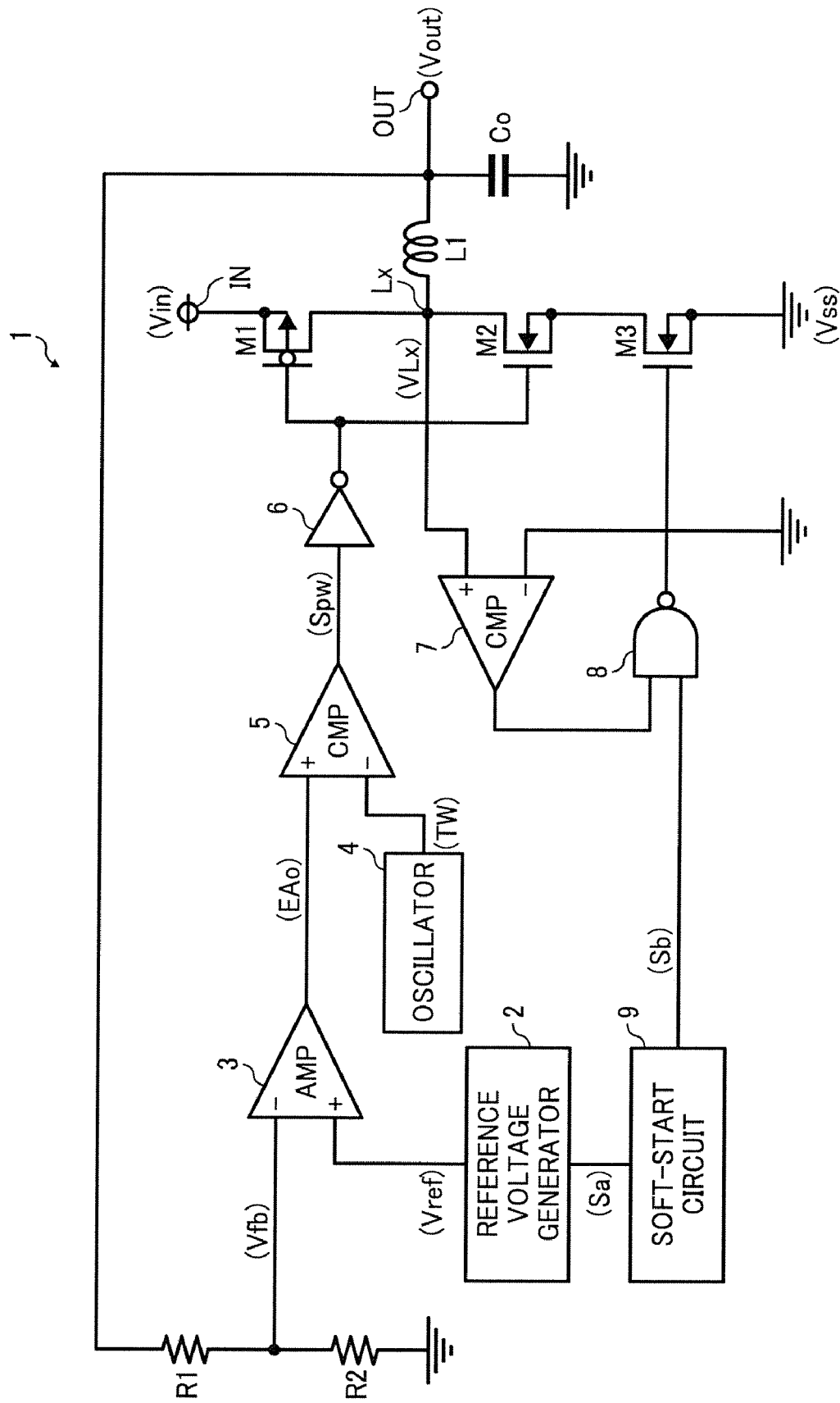
FIG. 2 illustrates a first example embodiment of a switching regulator according to the present disclosure.

FIG. 2 illustrates a switching regulator 1 according to a first exemplary embodiment. The switching regulator 1 converts an input voltage Vin input at an input terminal IN to a predetermined voltage that is lower than the input voltage Vin, and outputs the converted voltage as an output voltage from an output terminal OUT.

The switching regulator 1 is a synchronization rectification type switching regulator, and includes a switching transistor M1, which is a PMOS transistor, and a synchronization rectification transistor M2, which is an NMOS transistor. Further, the switching regulator 1 includes a reference voltage generator 2, resistors R1 and R2 to detect the output voltage, an inductor L1, a capacitor CO for smoothing, an error amplifier 3, an oscillator 4, a PWM comparator 5, a reverse current protection transistor M3, an inverter 6, a comparator 7, an NAND circuit 8, and a soft-start circuit 9. The reverse current protection transistor M3 is formed of a NMOS transistor.

The switching transistor M1 forms a first switching element, the synchronization rectification transistor M2 forms a second switching element, and the reverse current protection transistor M3 forms a third switching element. The reference voltage generator 2, the resistors R1 and R2, the inductor L1, the capacitor Co, the error amplifier 3, the oscillator 4, the PWM comparator 5, and the inverter 6 form a control circuit unit. The reverse current protection transistor M3, the comparator 7, and the NAND circuit 8 form a reverse current protection circuit unit. The soft-start circuit 9 forms a soft-start circuit unit.

Excepting the capacitor Co and the inductor L1, all the circuit units may be integrated on a single chip. In some cases, all the circuit units may be integrated on a single chip except the capacitor Co, the inductor L1, and at least one of the switching transistor M1, the synchronization rectification transistor M2, and the reverse current protection transistor M3.

The reference voltage generator 2 generates and outputs a predetermined reference voltage $V_{ref}$, the resistors R1 and R2 for detection of the output voltage generate and output a divided voltage $V_{fb}$ by dividing the output voltage Vout. The error amplifier 3 amplifies a difference voltage between the divided voltage $V_{fb}$ input and the reference voltage $V_{ref}$, and generates and outputs an amplified voltage as an output signal EAo.

The oscillator 4 generates and outputs a predetermined triangular wave TW, and the PWM comparator 5 generates and outputs a pulse signal Spw by modulating the output signal EAo using PWM modulation based on the output signal EAo and the triangular wave TW. The pulse signal Spw is inverted by the inverter 6, and is input to each gate of the switching transistor M1 and the synchronization rectification transistor M2.

The comparator 7 detects an indication of the reverse current flowing through the synchronization rectification transistor M2. When the comparator 7 detects the indication of the reverse current, the reverse current protection transistor M3 is turned off. Accordingly, a connection between the synchronization rectification transistor M2 and ground is shut off so as to prevent a generation of the reverse current.

The soft-start circuit 9 increases an on-duty of the pulse signal Spw gradually for a predetermined time period from start-up to a predetermined elapsed time. For example, the soft-start circuit 9 causes the reference voltage generator 2 to increase the reference voltage Vref with a predetermined voltage increment to prevent an excess rush current from the input terminal IN and the overshoot of the output voltage Vout.

The switching transistor M1, the rectification transistor M2, and the reverse current protection transistor M3 are connected in series between the input terminal IN and ground. A connection node between the switching transistor M1 and the synchronization rectification transistor M2 is now defined as Lx. The inductor L1 is connected in series between the connection node Lx and the output terminal OUT. Between the output terminal OUT and ground, the resistors R1 and R2 are connected in series, and the output capacitor Co is connected in parallel. A divided voltage Vfb is output from a connection node between the resistors R1 and R2. The divided voltage Vfb is input to an inverted input terminal of the error amplifier 3, and the reference voltage $V_{ref}$ is input to a non-inverted input terminal of the error amplifier 3. The output terminal of the error amplifier 3 is connected to a non-inverted input terminal of the PWM comparator 5.

The triangular wave TW is input to an inverted input [MSOffice1]terminal of the PWM comparator 5. The pulse signal Spw output from the PWM comparator 5 is input to each gate of the switching transistor M1 and the synchronization rectification transistor M2 through the inverter 6. A non-inverted input terminal of the comparator 7 is connected to the connection node Lx, an inverted input terminal of the comparator 7 is connected to ground, and an output terminal of the comparator 7 is connected to one input terminal of the NAND circuit 8. The soft-start circuit 9 outputs a control signal Sa to the reference voltage generator 2 and a signal Sb to another input terminal of the NAND circuit 8. The signal Sb indicates whether a soft-start operation is being performed or not. An output terminal of the NAND circuit 8 is connected to a gate of the reverse current protection transistor M3.

With this circuit configuration, when the switching regulator 1 starts to operate, the soft-start circuit 9 causes the reference voltage generator 2 to perform the soft-start operation to increase the reference voltage Vref gradually with a predetermined voltage increment for a predetermined time T1 beginning from start-up. While performing the soft-start operation, the soft-start circuit 9 outputs the signal Sb with a low level. Accordingly, the NAND circuit 8 outputs a signal with a high level independently of the output signal of the comparator 7 so as to turn on the reverse current protection transistor M3 to create a state of conduction.

Consequently, when the reverse current occurs within the predetermined time T1, a voltage VLx at the connection node Lx becomes positive, and the output signal of the comparator 7 becomes a high level, it is not possible to turn off the reverse current protection transistor M3. Namely, while the soft-start circuit 9 performs the soft-start operation, the charge stored in the output capacitor Co discharges to ground through the inductor L1, the synchronization rectification transistor M2 and the reverse current protection transistor M3 even when the output capacitor Co stores an excess charge due to the overdrive, and the output voltage Vout exceeds a normal-rated voltage. This is because the reverse current protection operation is prohibited in this condition. Thus, the occurrence of the overshoot in the output voltage Vout can be avoided.

So long as the soft-start operation is not being performed, the soft-start circuit 9 outputs a control signal Sa to cause the reference generator 2 to output a predetermined voltage $V_{ref}$ without the soft-start operation, and makes the signal Sb a high level. As a result, the NAND circuit 8 inverts the output signal of the comparator 7, and outputs an inverted signal to the gate of the reverse current protection transistor M3. In this case, the voltage VLx at the connection node Lx is lower than a ground voltage Vss. When there is no indication of the reverse current flowing from the connection node Lx to ground, the comparator 7 outputs a low level. Therefore, the reverse current protection transistor M3 is turned on to create a state of conduction because a high level signal is input to the gate of the reverse current protection transistor M3.

When the output voltage Vout of the switching regulator 1 increases, the output signal Eao of the error amplifier 3 decreases. Further, the on-duty cycle of the pulse signal Spw from the PWM comparator 5 decreases. Accordingly, the on-time of the switching transistor M1 decreases, and the on-time of the synchronization rectification transistor M2 increases. Consequently, the output voltage Vout of the switching regulator 1 is decreased.

When the output voltage Vout of the switching regulator 1 decreases, the output signal Eao of the error amplifier 3 increases. Further, the on-duty cycle of the pulse signal Spw from the PWM comparator 5 increases. Accordingly, the on-time of the switching transistor M1 increases, and the on-time of the synchronization rectification transistor M2 decreases. Consequently, the output voltage Vout of the switching regulator 1 is increased.

The above operations are repeated so that the output voltage Vout maintained at a predetermined constant voltage.

When the indication of the reverse current is detected, for example, when the voltage VLx at the connection node Lx becomes the ground voltage Vss, or the reverse current is detected by the detection of the voltage VLx at the connection node Lx exceeding the ground voltage Vss, the comparator 7 outputs a high level. Accordingly, a signal with a low level is input to the gate of the reverse current protection transistor M3, and the reverse current protection transistor M3 turns off to create a shutdown state. Thus, the comparator 7 detects whether there is the indication of the reverse current at the synchronization rectification transistor M2 or not based on the voltage VLx at the connection node Lx.

When the indication of the reverse current is detected, the reverse current protection transistor M3 connected in series to the synchronization rectification transistor M2 is shut off so as to cut off a connection between the synchronization rectification transistor M2 and ground. Consequently, the generation of the reverse current flowing through the synchronization rectification transistor M2 can be securely prevented.

In the switching regulator 1 according to the first example embodiment, an independent circuit different from the control circuit for the synchronization rectification transistor M2 is employed to cut off the synchronization rectification transistor M2. Accordingly, it becomes possible to shorten a delay time from when the reverse current is detected to when the reverse current is cut off. Further, it is possible to improve an efficiency of the switching regulator, and to make a circuit design easy because the design can be made simple.

Thus, in the switching regulator 1 according to the first example embodiment, while the soft-start circuit 9 performs the soft-start operation, the reverse current protection transistor M3 turns on to create a state of conduction independently of the output signal of the comparator 7. Further, even when the overshoot of the output voltage at start-up occurs, the charge stored in the output capacitor Co discharges to ground through the synchronization rectification transistor M2. Accordingly, the occurrence of the overshoot in the output voltage Vout at start-up can be avoided.

As described above, in the switching regulator according to the first example embodiment, the reverse current protection transistor M3 is employed to prevent the reverse current. However, in a switching regulator according to a second example embodiment, the synchronization rectification transistor M2 is shut off to create a shutdown state without using the reverse current protection transistor M3.

Figure 3:
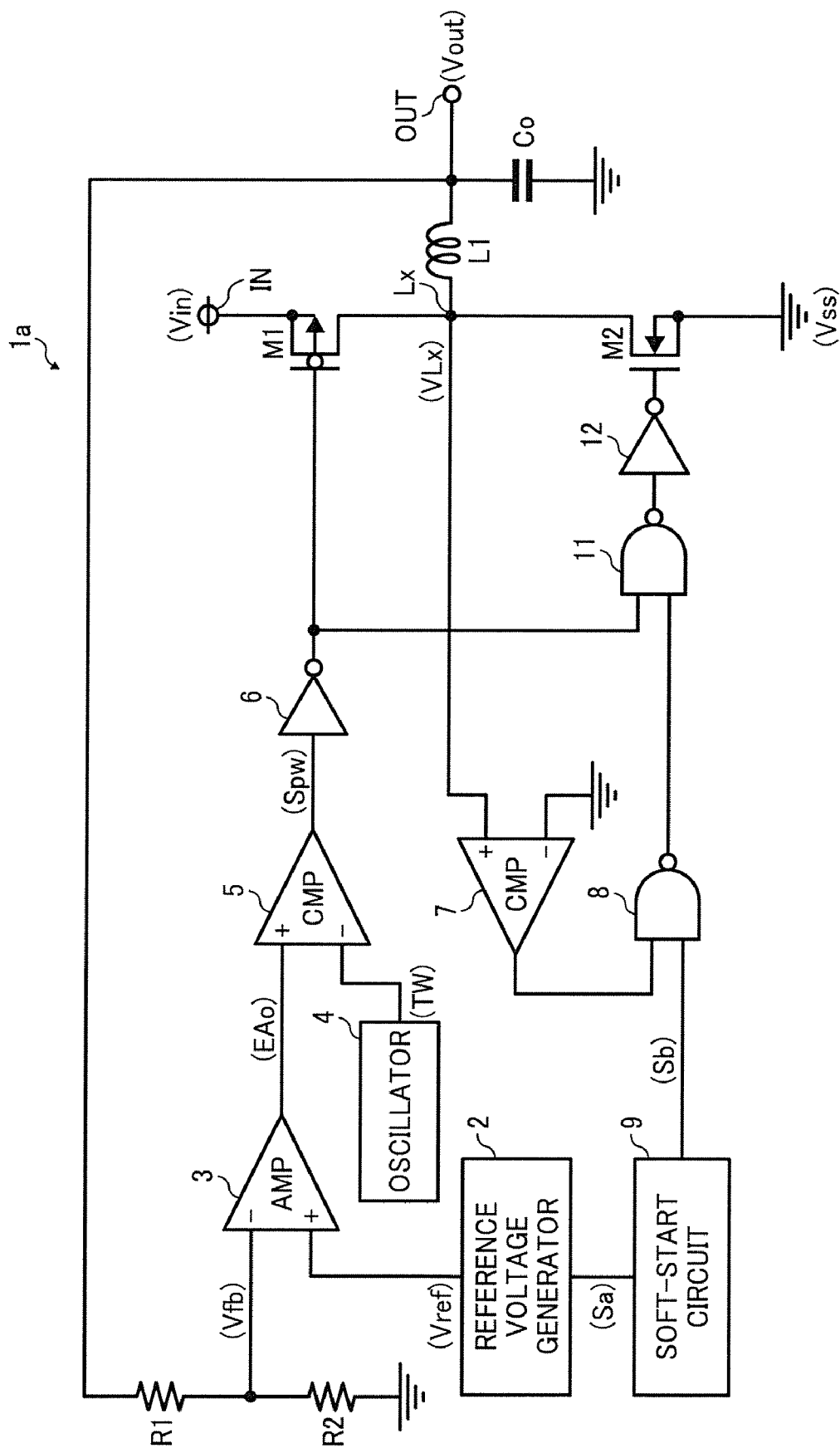
FIG. 3 illustrates a second example embodiment of the switching regulator according to the present disclosure.

FIG. 3 illustrates a switching regulator 1a according to the second example embodiment. The switching regulator 1a shown in FIG. 3 differs from the switching regulator 1 shown in FIG. 2 in that the reverse current protection transistor M3 is replaced by a NAND circuit 11 and an inverter 12.

In FIG. 3, the switching regulator 1a is a synchronization rectification type switching regulator, which converts an input voltage Vin input at an input terminal IN to a predetermined voltage that is lower than the input voltage Vin, and outputs the converted voltage as an output voltage from an output terminal OUT.

The switching regulator 1a includes a switching transistor M1, a synchronization rectification transistor M2. Further, the switching regulator 1a includes a reference voltage generator 2, resistors R1 and R2, an inductor L1, a capacitor CO, an error amplifier 3, an oscillator 4, a PWM comparator 5, inverters 6 and 12, a comparator 7, NAND circuits 8 and 11, and a soft-start circuit 9.

The reference voltage generator 2, the resistors R1 and R2, the error amplifier 3, the oscillator 4, the PWM comparator 5, and the inverters 6 and 12 and the NAND circuit 11 form a control circuit unit. The comparator 7 and the NAND circuit 8 form a reverse current protection circuit unit. Excepting the inductor L1 and the capacitor Co, all the circuit units may be integrated on a single chip. In some case, all the circuit units may be integrated on a single chip excepting the capacitor Co and the inductor L1, and at least one of the switching transistor M1 and the synchronization rectification transistor M2.

The switching transistor M1 and the synchronization rectification transistor M2 are connected in series between the input terminal IN and ground. A pulse signal Spw output from the comparator 5 is connected to a gate of the switching transistor M1 and one input terminal of the NAND circuit 11 through the inverter 6. An output terminal of the NAND circuit 8 is connected to another input terminal of the NAND circuit 11, and an output terminal of the NAND circuit 11 is connected to a gate of the synchronization rectification transistor M2 through the inverter 12.

With this circuit configuration, when the switching regulator 1a starts to operate, the soft-start circuit 9 causes the reference voltage generator 2 to perform the soft-start operation to increase the reference voltage $V_{ref}$ gradually with a predetermined voltage increment for a predetermined time T1 beginning from start-up using a control signal Sa. While performing the soft-start operation, the soft-start circuit 9 makes the signal Sb low. Accordingly, the NAND circuit 8 outputs a signal with a high level independently of the output signal of the comparator 7. The signal with a high level is input to a corresponding input terminal of the NAND circuit 11. The NAND circuit 11 outputs an inverted signal of the output signal of the inverter 6. The output signal of the NAND circuit 11 is inverted and is input to a gate of the synchronization rectification transistor M2. Namely, a signal of a level equal to that of the output signal of the inverter 6 is input to the gate of the synchronization rectification transistor M2.

Accordingly, when the reverse current occurs within a predetermined time T1, a voltage VLx at the connection node Lx becomes positive, and the output signal of the comparator 7 becomes a high level, it is not possible to turn off the synchronization rectification transistor M2. The synchronization rectification transistor M2 switches on/off in accordance with the signal level of the output signal of the inverter 6.

Specifically, while the soft-start circuit 9 performs the soft-start operation, the charge stored in the output capacitor Co discharges to ground through the inductor L1 and the synchronization rectification transistor M2 even when the output capacitor Co stores an excess charge due to the overdrive and the output voltage Vout exceeds a normal-rated voltage. This is because the reverse current protection operation is prohibited in this condition. Accordingly, an occurrence of the overshoot in the output voltage Vout can be avoided.

So long as the soft-start operation is not performed, the soft-start circuit 9 outputs a control signal Sa to cause the reference generator 2 to output a predetermined voltage $V_{ref}$ without the soft-start operation, and make the signal Sb a high level. As a result, the NAND circuit 8 inverts the signal level of the output signal of the comparator 7, and outputs the inverted signal to a corresponding input terminal of the NAND circuit 11. That is, a signal equal to the inverted output signal of the comparator 7 is input to the corresponding input terminal of the NAND circuit 11.

In this case, when the voltage VLx at the connection node Lx is below ground voltage Vss and there is no indication of the reverse current from the connection node Lx to ground, the comparator 7 outputs a low level and a signal with a high level is input to the corresponding input terminal of the NAND circuit 11. Accordingly, a signal equal to the output signal of the inverter 6 is input to the gate of the synchronization rectification transistor M2.

When the voltage VLx at the connection node Lx becomes the ground voltage Vss and the indication of the reverse current is detected, or the reverse current is detected by detecting that the voltage VLx at the connection node Lx is exceeding the ground voltage Vss, the comparator 7 outputs a signal with a high level. A signal with a low level is input to the corresponding input terminal of the NAND circuit 11. Accordingly, the NAND circuit 11 outputs a signal with a high level independently of the output signal of the inverter 6. The inverter 12 inverts the output signal of the NAND circuit 11 and outputs an inverted signal to the gate of the synchronization rectification transistor M2.

Accordingly, a signal with a low level is input to the gate of the synchronization rectification transistor M2 so that the synchronization rectification transistor M2 turns off to create a shutdown state. Thus, the comparator 7 detects whether there is the indication of the reverse current at the synchronization rectification transistor M2 or not based on the voltage VLx at the connection node Lx. When the indication of the reverse current is detected, the synchronization rectification transistor M2 is shut off. Consequently, the generation of the reverse current flowing through the synchronization rectification transistor M2 can be securely prevented.

Thus, in the switching regulator according to the second example embodiment, while the soft-start circuit 9 performs the soft-start operation, the synchronization rectification transistor M2 is turned on/off in accordance with the output signal of the inverter 6. Accordingly, it is possible to obtain a similar effect to that of the switching regulator according to the first example embodiment described above. Further, the reverse current prevent transistor M3 used in the switching regulator according to the first example embodiment is not necessary.

With this circuit configuration, more control logic circuits are necessary compared to the switching regulator according to the first example embodiment. However, a chip size of the switching regulator can be made small when the switching circuit is integrated on a single chip because the reverse current prevent transistor M3, which is large in order to accommodate large current flows, is not necessary. As a result, it is possible to achieve cost reduction. Further, it is possible to have better power conversion efficiency because there is no voltage drop due to the reverse current prevent transistor M3.

The step-down type switching regulators are described in the first and second example embodiments. However, the concept of this disclosure is equally applicable to other switching regulators, such as step-up type switching regulators.

As can be appreciated by those skilled in the art, numerous additional modifications and variations of the foregoing embodiments are possible in light of the above teachings. It is therefore to be understood that, within the scope of the appended claims, the disclosure of this patent specification may be practiced otherwise than as specifically described herein.

What is claimed is:

1. A switching regulator, comprising:
   a first switch configured to switch in accordance with a first control signal;
   an inductor configured to store charge from an input voltage by switching the first switch;
   a second switch configured to discharge a charge stored in the inductor in accordance with a second control signal;
   a control circuit configured to control a switching operation by switching the first switch and switching the second switch complementally to the first switch to obtain a constant output voltage;
   a reverse current protection circuit configured to shut off a current through the second switch to prevent a reverse current from an output terminal toward the second switch; and
   a soft-start circuit configured to cause the control circuit to perform a soft-start operation in which the output voltage is being increased gradually with a predetermined increment during a time period from a start-up to a predetermined elapsed time,
   wherein the soft-start circuit causes the reverse current protection circuit to stop a shutoff operation of the current through the second switch when a generation or an indication of the reverse current is detected during the soft-start operation instructed by the control circuit.

2. The switching regulator of claim 1, wherein the reverse current protection circuit shuts the second switch off to stop the current flowing through the second switch when the reverse current protection circuit detects the generation or the indication of the reverse current based on a voltage at a connection node between the first switch and the inductor.

3. The switching regulator of claim 1, wherein the reverse current protection circuit comprises:
- a third switch connected in series with the first switch and the second switch between an input terminal and ground and configured to switch in accordance with a third control signal;
- a reverse current detection circuit configured to shut the third switch off to stop the current flowing through the second switch when the reverse current protection circuit detects the generation or the indication of the reverse current based on a voltage at a connection node between the first switch and the inductor.

4. The switching regulator of claim 1, wherein the reverse current protection circuit shuts the second switch off to stop the current flowing through the second switch independently of a control signal output from the control circuit when the reverse current protection circuit detects the generation or the indication of the reverse current based on a voltage at a connection node between the first switch and the inductor.

* * * * *